R. R. STEVENS.
Apparatus for Converting Motion.
No. 146,845.　　　　　　　　　　　Patented Jan. 27, 1874.
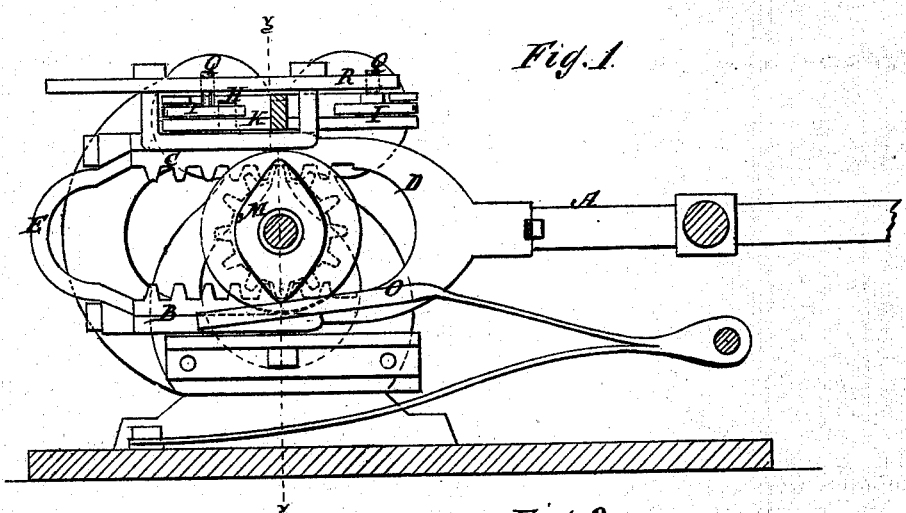
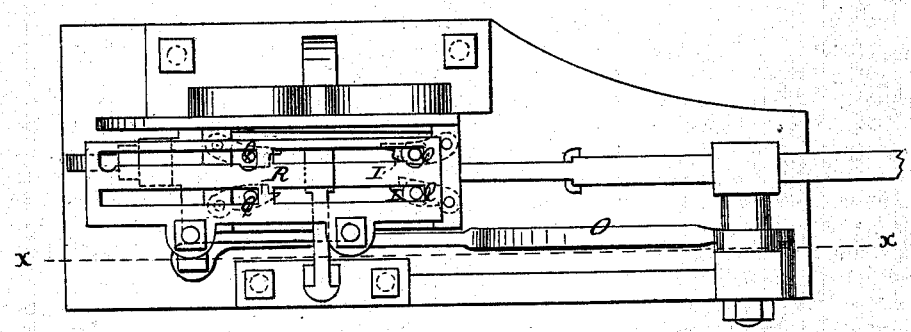
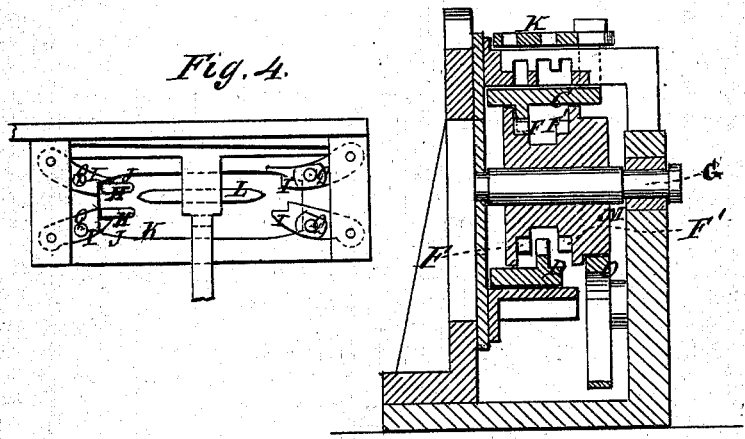

UNITED STATES PATENT OFFICE.

ROMULUS R. STEVENS, OF STOCKTON, CALIFORNIA, ASSIGNOR TO HIMSELF AND LEWIS M. CUTTING, OF SAME PLACE.

IMPROVEMENT IN APPARATUS FOR CONVERTING MOTION.

Specification forming part of Letters Patent No. 146,845, dated January 27, 1874; application filed December 1, 1873.

*To all whom it may concern:*

Be it known that I, ROMULUS R. STEVENS, of Stockton, in the county of San Joaquin and State of California, have invented a new and Improved Apparatus for Converting Motion, of which the following is a specification:

My invention consists of a reciprocating toothed bar above the axis of the shaft to be driven, and another below it, in different planes, connected together by yokes, in combination with one toothed wheel (or two, if preferred) on the shaft, and apparatus for shifting the bars at each end of the stroke to change them, so that one turns the wheel going one way, and the other when going the other way, thus giving continuous motion to the wheel. My invention also consists of a cam and spring, so combined with the shaft as to expend some of the excess of the power of the piston at mid-stroke on the spring, and return it to the shaft during the latter portion of the stroke, when the effect of the steam is diminished, to equalize the application of power.

Figure 1 is a sectional elevation of my improved apparatus, taken on the line $x\ x$, Fig. 2. Fig. 2 is a plan view. Fig. 3 is a transverse section taken on the line $y\ y$ of Fig. 1, and Fig. 4 is a plan of one of the parts employed to shift the toothed bars.

A is the connecting-rod, or extension of the piston-rod; B, the lower toothed bar; C, the upper one; D, the yoke connecting them together and to the rod A at one end, and E the yoke connecting them together at the outer ends. F and F' represent two toothed wheels, side by side, on the shaft G, to be alternately acted on by the said toothed bars, which are in planes a little distance apart, so that when one is gearing with its wheel, the other is in the space between the wheels.

The shifting is effected by little studs H in the upper side of the toothed bar C, and the swinging dogs I on the stationary plate K, one of the said studs striking one of the dogs in the notch at its end as the bar comes to the end of its movement, and swinging across to the opposite side of the slot in the stationary guide-plate K, the dogs carrying the bars by their pins Q, which act in the slotted plate R, connected to the upper toothed bar. The swinging of the dogs is effected by reason of the studs striking them eccentrically to the pivots on which they turn. The curves J in the walls of the guide-slot aid in starting the bars and the dogs across.

L is a stationary guide along the middle of the guide-slot, to keep the toothed bars in gear with their respective wheels during the movements of the bars by the studs H, which go up one side of it and down the other side.

I prefer to use one cog-wheel instead of two, arranging it so that one rack will shift into it as the other leaves it.

M represents the cam, and O the spring for taking the excess of power during the fore and middle part of the motion, and giving it back during the latter part, when the pressure falls in the engine, which is effected by the arrangement of the cam to press the spring down in the fore part of the movement, and allow it to rise in the other part.

By this arrangement I expect to economize largely in power, because the application of it is always at the rims of the toothed wheels; also, because it enables me to dispense with the balance-wheel, and to run the engine slower, as compared with the speed of the driving-shaft.

Having thus described my invention, I claim as new and desire to secure by Letters Patent—

1. The combination of the reciprocating toothed bars B C and a shifting apparatus, H I, with wheels F F' on the driving-shaft, substantially as specified.

2. The combination of the stationary guides K, J, and L, shifting-dogs I, and the studs H on one of the reciprocating toothed bars, substantially as specified.

3. The combination of a spring, O, and cam M with the driving-shaft, substantially as specified.

ROMULUS R. STEVENS.

Witnesses:
R. S. ELLSWORTH,
H. G. ROBINSON.